United States Patent [19]
Nordstrom

[11] 3,850,283
[45] Nov. 26, 1974

[54] AIR CARGO CONTAINER LOADER

[75] Inventor: Arnold B. Nordstrom, Torrance, Calif.

[73] Assignee: Aircraft Mechanics, Inc., Colorado Springs, Colo.

[22] Filed: May 5, 1972

[21] Appl. No.: 250,522

[52] U.S. Cl. ................................. 198/88, 198/233
[51] Int. Cl. ........................................... B65g 37/00
[58] Field of Search ........................ 198/88, 91–92, 198/94, 99, 233, 93, 120.5; 214/520, 38 BA

[56] References Cited
UNITED STATES PATENTS

| | | | |
|---|---|---|---|
| 3,580,141 | 5/1971 | Richter | 198/20 T |
| 3,655,024 | 4/1972 | Horn | 198/20 T |
| 3,687,276 | 8/1972 | Pelletier | 198/88 |

FOREIGN PATENTS OR APPLICATIONS

| | | | |
|---|---|---|---|
| 80,423 | 4/1920 | Germany | 198/233 |

*Primary Examiner*—Edward A. Sroka
*Attorney, Agent, or Firm*—McNenny, Farrington, Pearne & Gordon

[57] ABSTRACT

A mobile conveyor for the loading and unloading of aircraft and the like comprises three in-line conveyor sections mounted on a powered vehicle for variably inclined, coplanar operation for moving cargo containers therealong from one section to another between lower and upper levels. The lower section is swingable about its outer end between a ground-engaging, horizontal position, for receiving or discharging containers, and its inclined position coplanar with the median section. The upper section is swingable about its outer end between a horizontal position at said upper level, for receiving or discharging containers, and its inclined position coplanar with said median section. Thus, containers may be moved in either direction along the conveyor while the sections are coplanarly inclined and, at either end of the conveyor, may be received or discharged horizontally. A single conveyor section may be mounted to duplicate the swinging of the upper and lower sections of the three-section embodiment and may be used alone to receive containers horizontally at either end and discharge them horizontally at the other end.

23 Claims, 20 Drawing Figures

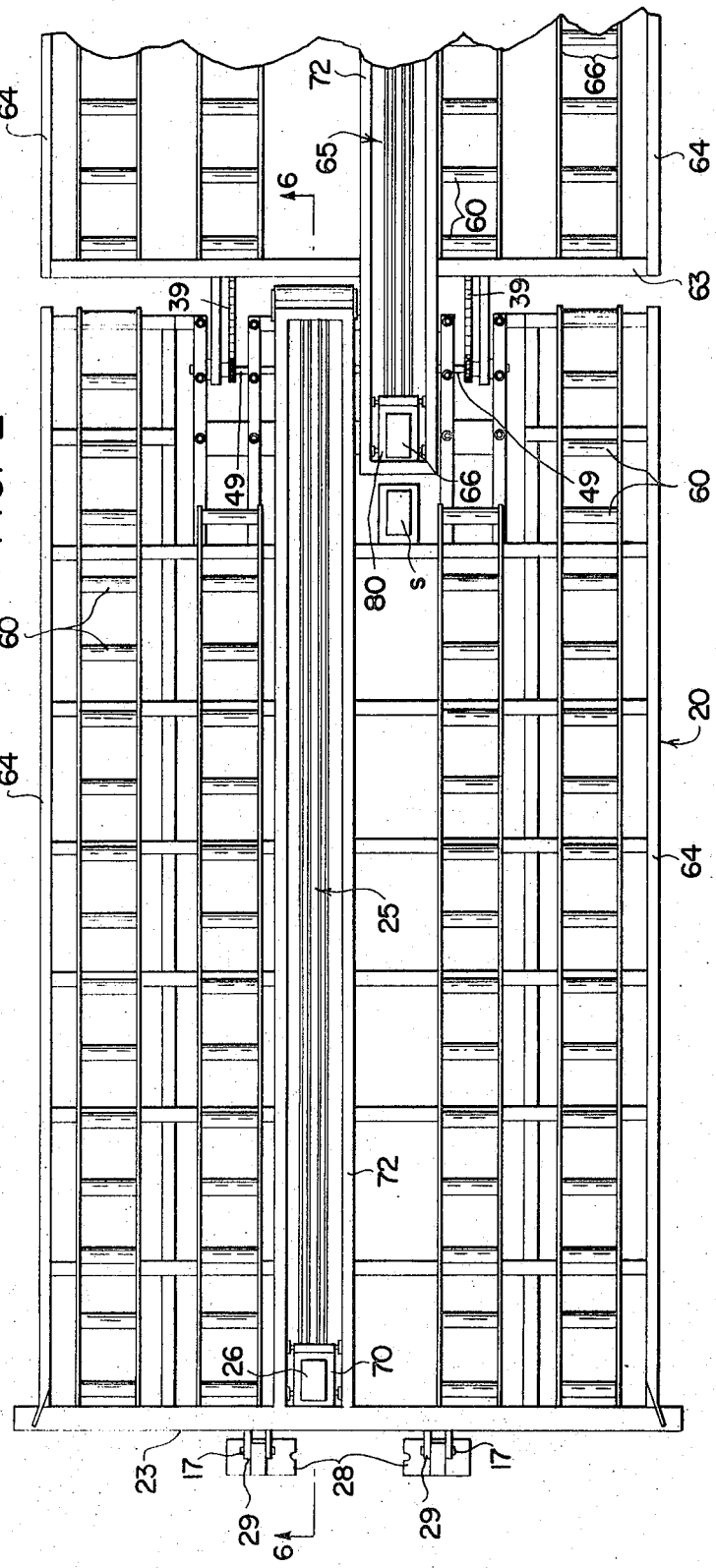

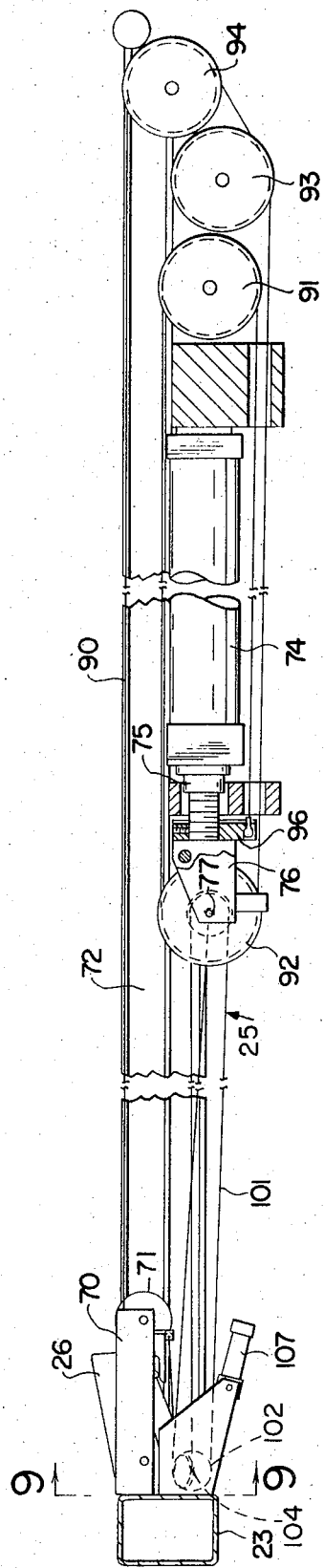
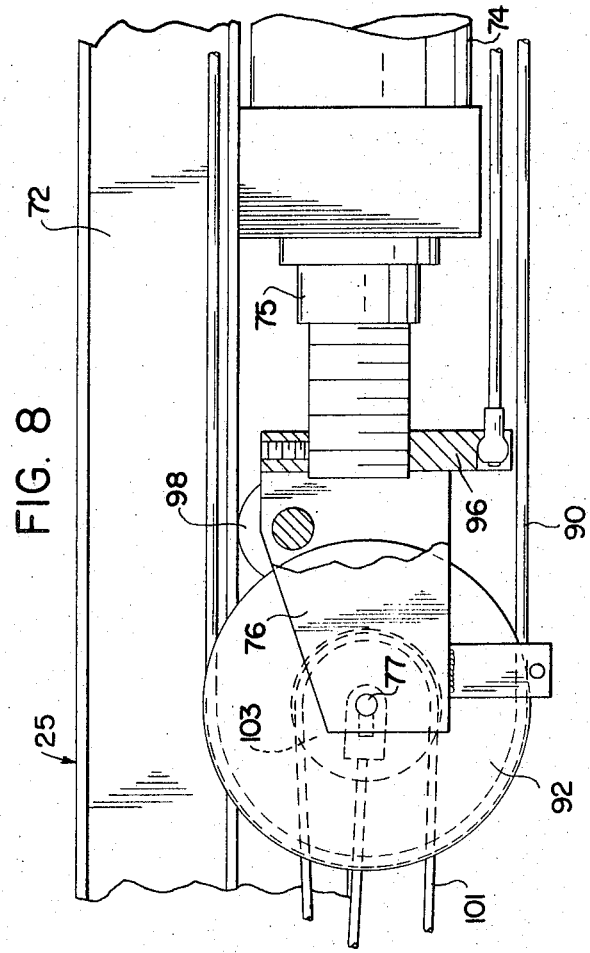
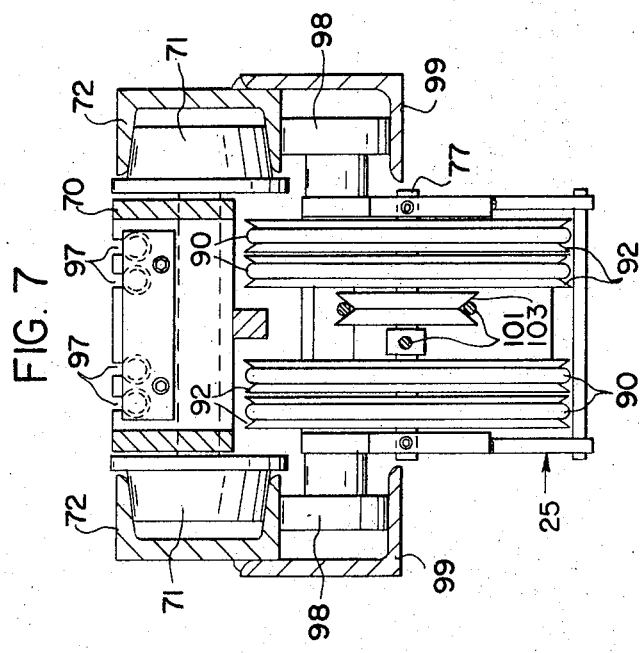

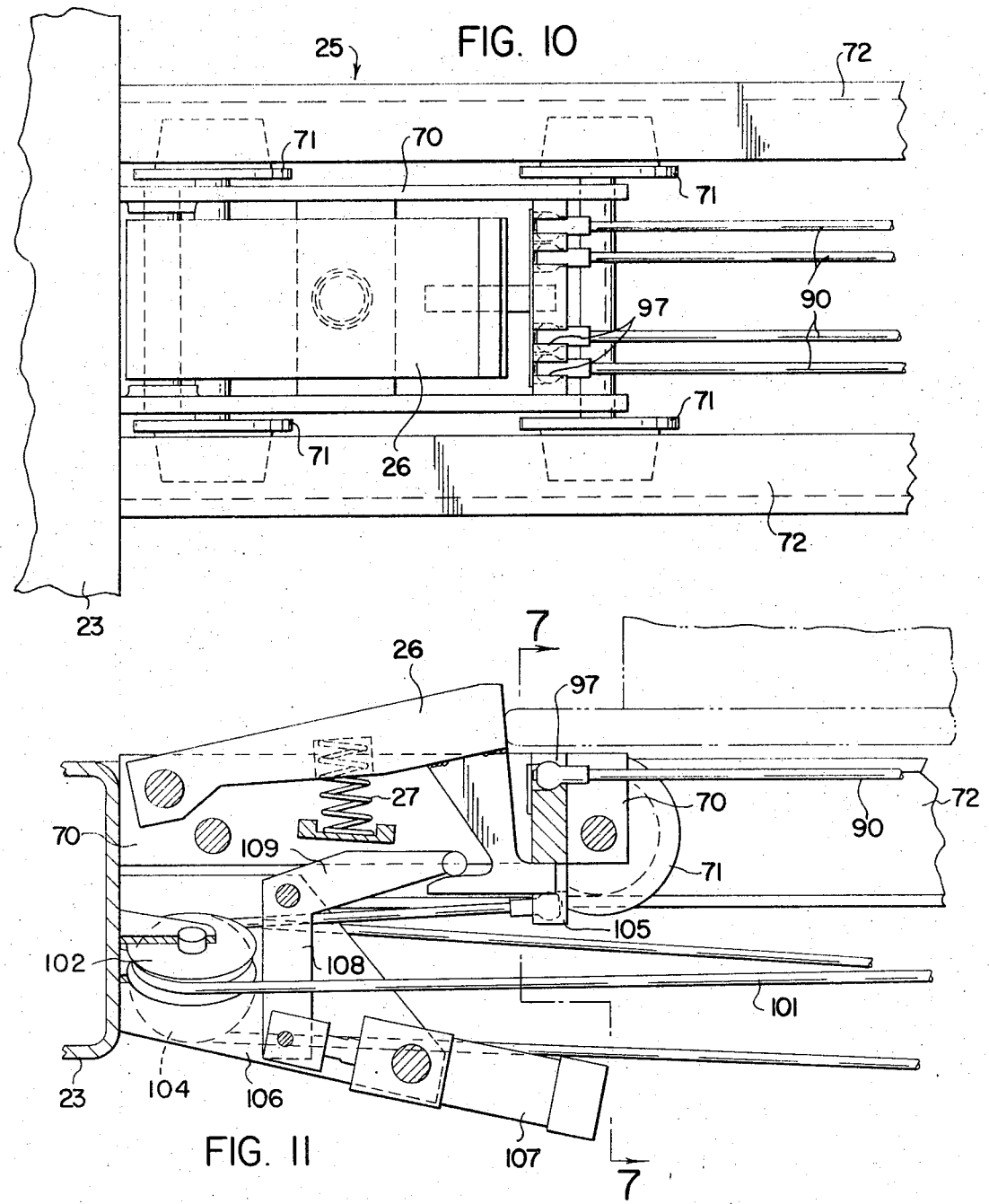

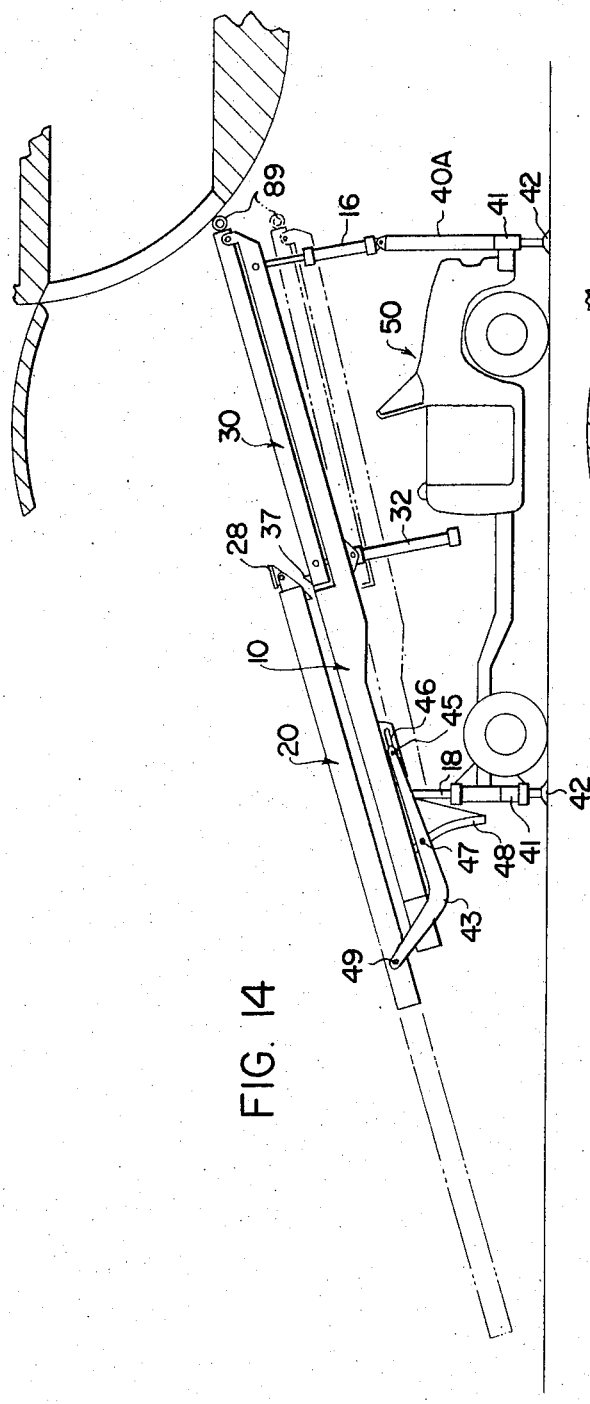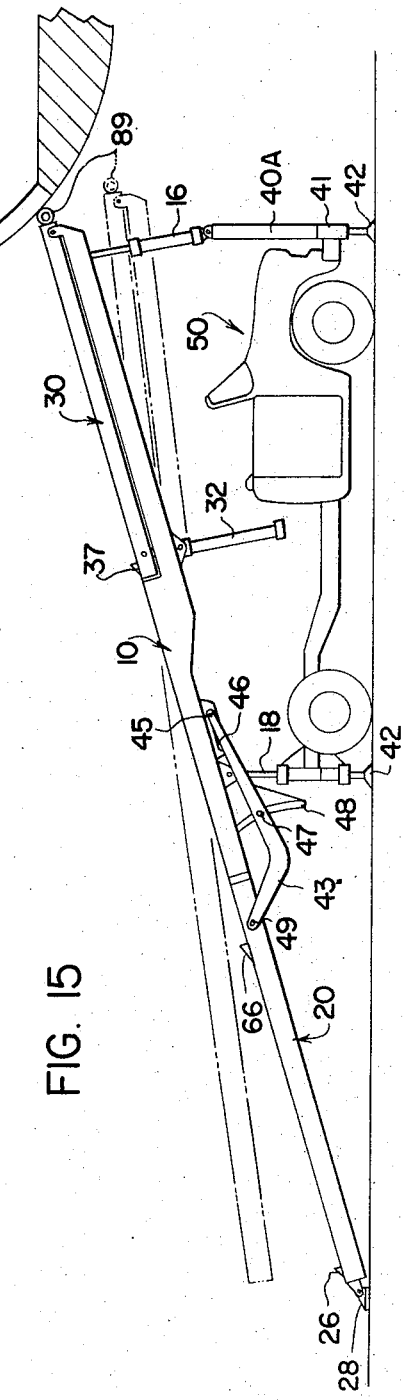

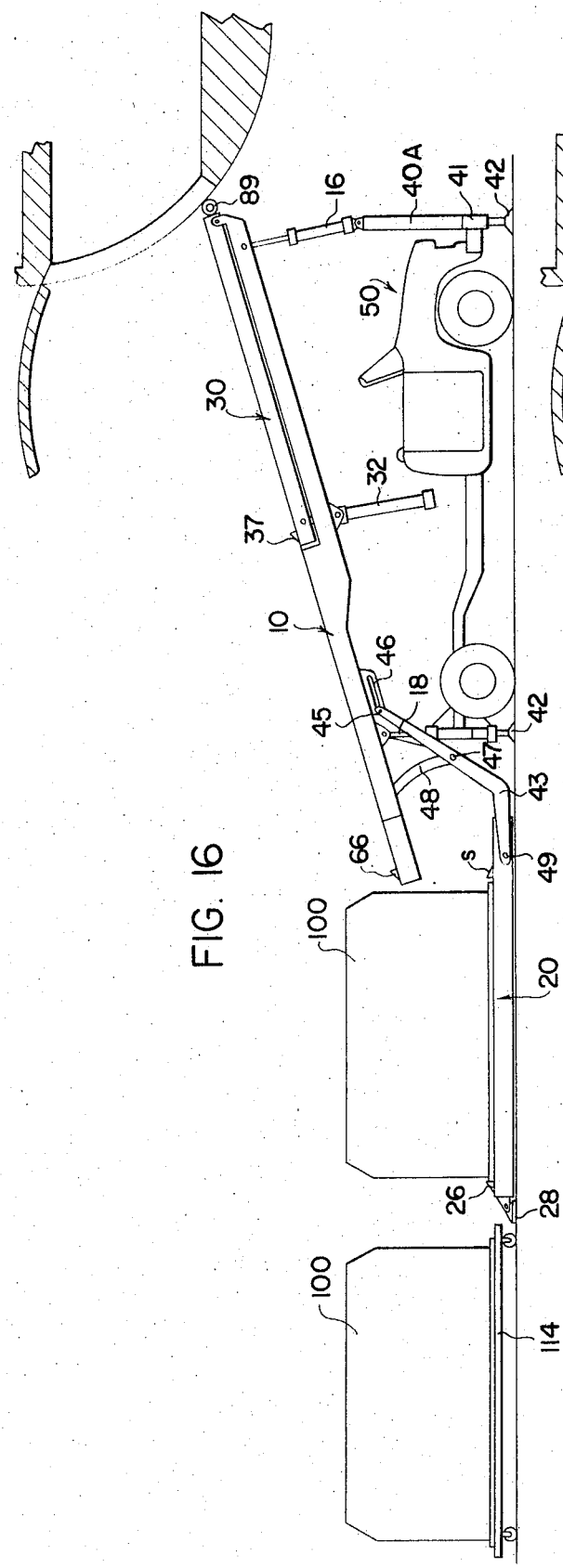
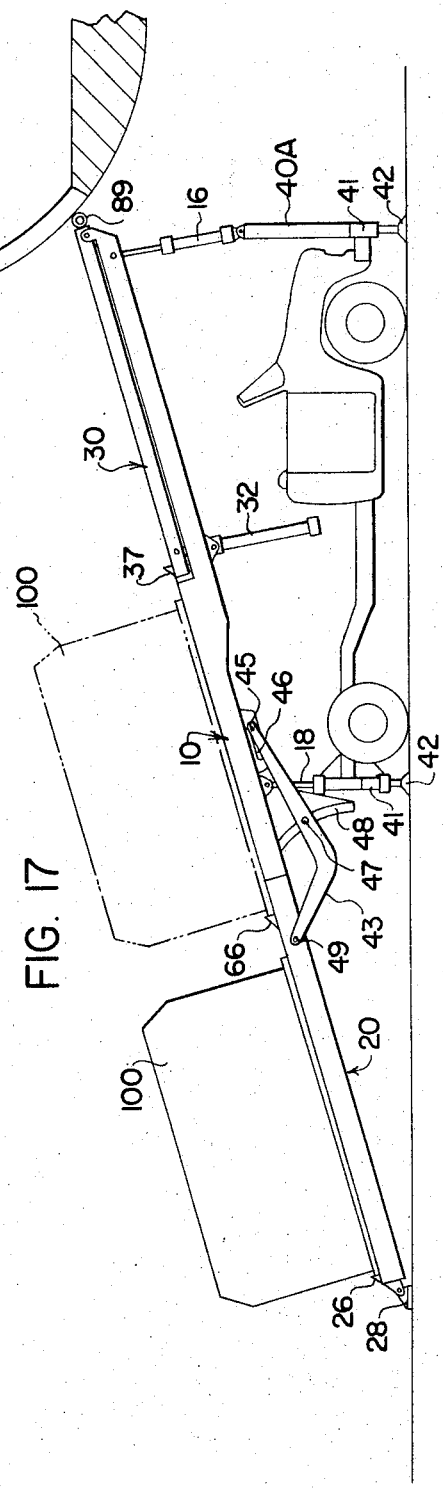
FIG. 16
FIG. 17

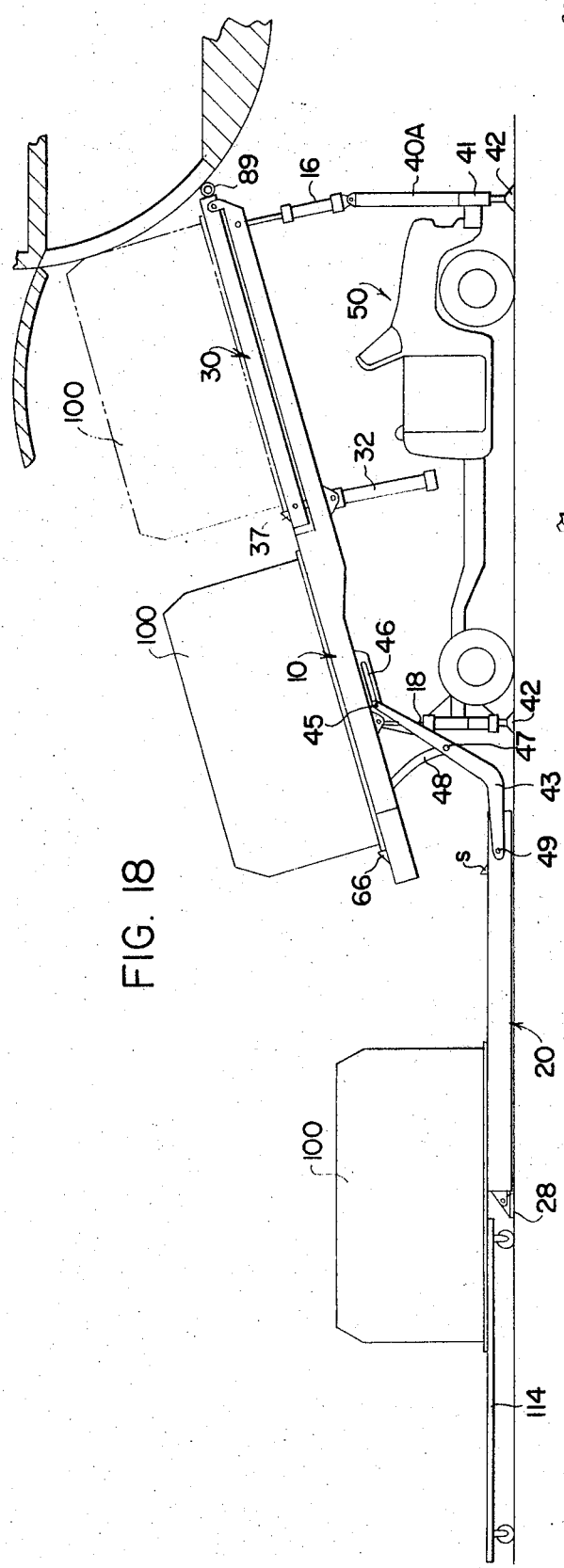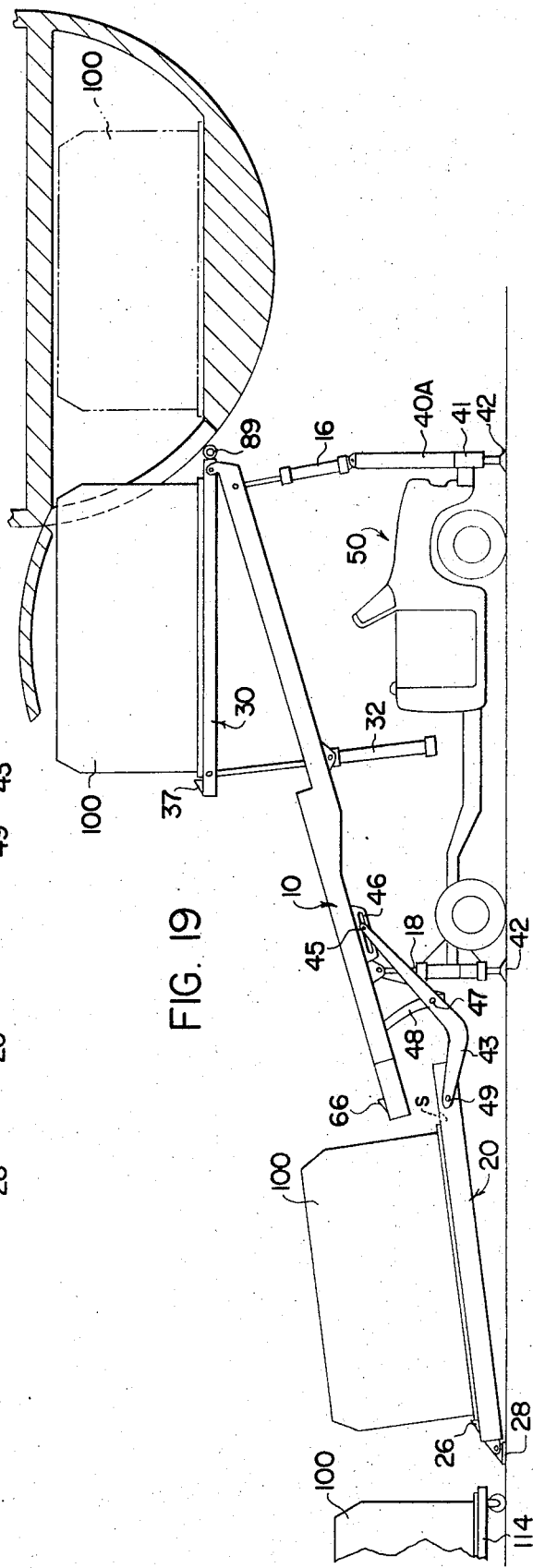

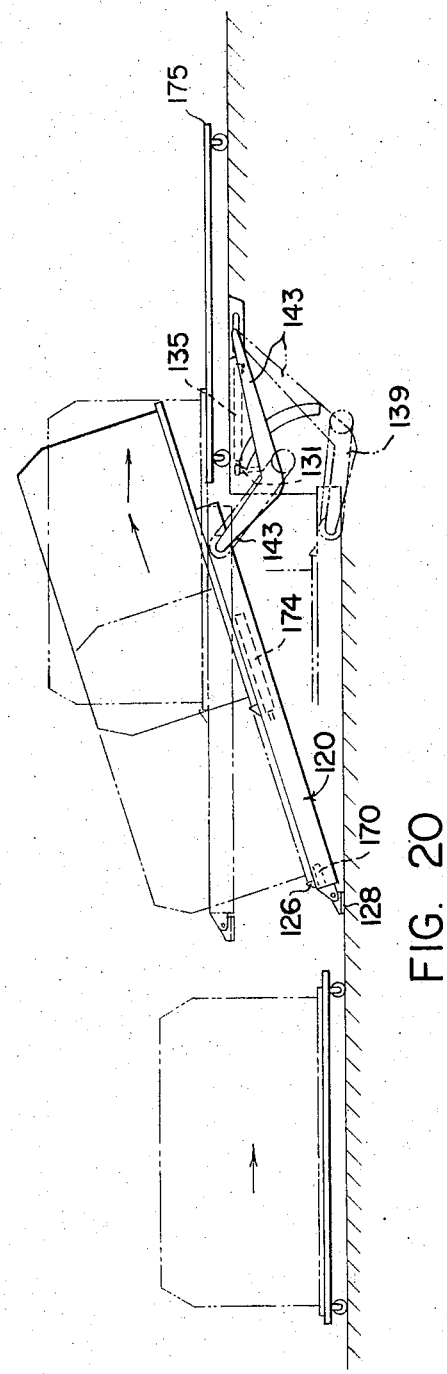

AIR CARGO CONTAINER LOADER

BACKGROUND OF THE INVENTION

This invention relates to transportable conveyor systems with plural sections. Most such conveyors have a moving, continuous conveying surface for receiving, transporting and depositing items to be conveyed. Such conveyors are unsuited for the conveying of relatively large items or packages such as cargo containers and relatively large crates.

In many cargo loading systems for trucks, railroad cars, and the like, the cargo is carried to a truck dock or platform by a conveyor belt or transport-dolly, and then picked up and loaded onto the truck or railroad car by a fork lift truck. Where the height of a vertical lift is relatively large, or where the weight of the load is relatively great, as for example, where heavy palletized containers are to be loaded into a large aircraft, a fork lift truck is impractical. A lifting device commonly used to effect such relatively large vertical lifts is the double-chain type which carries a platform to support the cargo, the platform remaining in a horizontal position during vertical movement by the supporting chains.

While the ladder type loading system provides obvious advantages over those systems utilizing fork lift trucks, a disadvantage with such systems is that each system must be uniquely designed to accommodate the expected vertical displacement between the cargo-carrying trucks or dollies and the loading deck of each aircraft. Furthermore, essentially vertical elevator type systems are discontinuous both in operation of the elevator mechanism and in transfer of the containers, the elevator having the capacity to handle only a single load at a time.

Most conveyor systems presently utilized for loading and unloading packages are of the type commonly used for transferring baggage in aircraft terminals today. They embody a moving, continuous conveying surface such as a conveyor belt. Where the conveyor is on a mobile wheeled chassis, it is the chassis which must support the weight of the conveyor along with that of the baggage thereupon. Also, for most continuous conveying surfaces, whether for unit articles or for bulk particulate material, the permissible net loading in pounds per linear foot of conveyor length is relatively low. Thus, they are not wellsuited to effect transfer of relatively heavy cargo containers, of more or less standard dimensions, for example, cargo containers as large of 10 ft. long × 7 ft. wide × 7 ft. high weighing as much as six or seven tons. Both the usual wheeled chassis which supports such a conveyor in operation and the conveyor itself are poorly suited for handling such large, heavy articles.

It is with respect to such special problems that particular devices have been developed such as are described in U.S. Pat. No. 3,578,145. Such a device includes a transport system which is adjustable in its vertical and horizontal dimensions and includes a platform construction and a chain drive system which make it possible for one power source to move the platform continuously in any direction. It is a vertical lift device which is permanently attached to a truck, replacing the loading gate of the truck. However, such devices of the type described in the prior art are inconvenient or impractical for use at smaller airports where partial air transport loads are handled, and where the costs for ground equipment must be minimized in view of relatively infrequent operation. To satisfy this need, it is apparent that the transfer mechanism must be simple in construction and operation and the wheeled chassis cannot be especially designed to accommodate the weight of both the conveyor and the cargo containers.

SUMMARY OF THE INVENTION

This invention provides a loading or unloading device which, in operation, is ground-supported. It inexpensively overcomes the disadvantages of the prior art, at the same time providing ease and convenience of operation.

In a particular embodiment, the conveyor comprises a median conveyor section and upper and lower conveyor sections mounted on a support structure which, in operation, is ground-supported. When the conveyor section is placed between a lower level and another horizontally and vertically displaced level between which levels containers are to be transported, the three conveyor sections are alignable coplanarly in longitudinal, inclined, end-to-end relationship. In a preferred, programmed operation, containers are loaded or unloaded with the conveyor by disposing the lower and upper conveyor sections discontinuously, in vertically offset relationship to the median conveyor section; the lower conveyor section being rotatable about its ground-supported lower end from an inclined position coplanar with the median conveyor section, into a generally horizontal "down" position; and the upper conveyor section being rotatable about the horizontal axis along its upper end, into an "up" generally horizontal position.

The lower conveyor section is mounted with respect to the median section on a pair of oppositely disposed actuating support arms which rotatably support the lower section so as to swing it back and forth between its generally horizontal and its inclined positions. The upper conveyor section is mounted with respect to the median section for rotation about an axis through its upper end, between its inclined position and its generally horizontal position. Each conveyor section is provided with plural rollers adapted to rollingly advance a container urged up or down each conveyor section by a translator mechanism which is a part of each conveyor section and which may be the same or different in each conveyor section. The translators of the lower and median sections are preferably equipped with a wheeled dolly guidedly translatable in tracks and urged back and forth therein by means of cables reeved on pulleys, forces on the cables being provided by suitable fluid-actuators. It will be understood that a translator, as referred to herein, includes components of the mechanism which urges a container along the surface of any conveyor section.

Thus, in operation, the median section remains stationary while the lower and upper sections oscillate between an inclined, coplanar attitude and a vertically offset attitude with respect to the median section, to effect transfer of a container horizontally on or off the conveyor. Though the handling of each container involves alternate stepped discontinuation and coplanar continuation of adjacent conveyor sections, the movement of a series of containers is essentially continuous in that a multiplicity of containers may be transferred sequentially without a significant delay in the sequential acceptance and discharge of successive containers.

For storage, the lower conveyor section is rotatable about the pair of actuating support arms by a drive mechanism adapted to swing the section into upside down, overlying relationship with the median conveyor section.

The illustrated conveyor is mounted on a wheeled chassis for mobility, but since in operation it is ground-supported, it is not a "transporter" as that term is used in the art. Since heavy containers are moved up an inclined plane by translators in the lower conveyor section and the median conveyor section, while the support structure of the conveyor is ground-supported, a relatively low-power prime mover, usually a 'take-off' from the power means for the wheeled chassis on which the instant loader is mounted, provides sufficient power for the loader.

In another embodiment of the instant invention, for transferring a container from a lower level to another vertically and laterally displaced higher level, as between the ground and a dock surface, or between the ground level and a truck bed, the lower conveyor section disposed on a pair of actuating support arms described hereinabove is used as the only and single conveyor section. In this embodiment, the single section is ground-supported on one end in a generally horizontal container-receiving position and a container is moved on to its surface from that end. The pair of actuating support arms raises the other end until it abuts the higher level thus inclinedly disposed the section in container-transferable connection between the lower and higher levels. As before, the single section is provided with multiple rollers adapted to rollingly transfer a container which is urged up the inclined surface by a translator until the container is moved half way off the upper end of the single section, minimizing the moment required to tip it to a horizontal disposition. Thereafter, the lower ground-supported end of the single section is raised to a generally horizontal position coplanar with the higher level and the translator continues to urge the container completely off the single section onto the higher surface. Having transferred the container from the lower level to the higher level, the single section is then lowered into a generally horizontal container-receiving position to receive the next container.

For storage after use, the single section is pivotable about the pair of actuating support arms by a drive mechanism adapted to swing the section into a vertical position in which it may be locked for storage while occupying a minimum deck space on the lower level, or to swing the section, upside down, in overlying relationship upon the higher level for storage.

BRIEF DESCRIPTION OF THE DRAWINGS

FIG. 2 is a plan view of the lower conveyor section and part of the median conveyor section of the loader;

FIG. 3 is an end view of the lower conveyor section of the loader supported in a horizontal position;

FIG. 6 is a longitudinal section along the plane 6—6 in FIG. 2 in the lower or median conveyor sections showing details of the cable system in the translator which provides controlled to-and-fro movement of a container either being loaded or unloaded;

FIG. 7 is a transverse section along the line 7—7 in FIG. 11 showing details of the translator dolly as translatably track-supported within the lower or median conveyor sections;

FIG. 8 is a view on an enlarged scale of a portion of the structure of FIG. 6 showing details of a drive pulley rotatably mounted on a two-way fluid actuator which comprises a part of the mechanism in translators or the lower and median conveyor sections;

FIG. 10 is a bottom plan view of the dolly tethered with plural cables in its track support;

FIG. 11 is an enlarged, vertical, partially broken away, sectional view of the dolly as shown in FIG. 6, and shows details of a portion of the pulley arrangement and cables in the translator for effecting to-and-fro movement of the dolly within its track support;

FIG. 12 is an exploded view showing an adaptor stand and the lower end of the lower conveyor section adapted to be locked together for supporting the latter at an adjustable height well above the ground for accommodating the height of a truck bed or the like;

FIG. 14 is a side elevation diagrammatically showing the mobile air cargo loader as it is initially positioned against the cargo deck of an aircraft;

FIG. 15 is a side elevation diagrammatically showing the loader with the lower conveyor section in an operative position and the attitude of the conveyor section assembly adjusted to place the lower end of the lower section in a ground-supported position;

FIG. 16 is a side elevation diagrammatically showing a cargo container in position to be transferred to a location shown in phantom outline on the lower conveyor section which has been swung to a "down", horizontal, container-receiving positon;

FIG. 17 is a side elevation diagrammatically showing the lower conveyor section raised into an inclined position coplanar with the median and upper conveyor sections for moving the container upwardly along the three sections as indicated in phantom outline;

FIG. 18 is a side elevation diagrammatically showing the container of FIG. 17 after being transferred onto the median conveyor section for transfer next onto the upper conveyor section while the lower section in its down position is receiving a succeeding container;

FIG. 19 is a side elevation diagrammatically showing the upper conveyor section raised into a horizontal position for transferring the first container onto the deck of the aircraft while the lower conveyor section is being raised into its inclined container-transferring position for moving a succeeding container upwardly after the three sections; and FIG. 20 is a side elevation diagrammatically showing a simplified embodiment of the invention wherein the lower conveyor section of the preferred embodiment is utilized as the only conveyor section and showing successive positions of the container during transfer.

DETAILED DESCRIPTION OF THE INVENTION

In a preferred embodiment, the loader is designed to handle LD-3, LD-7, type A or B containers* or palletized loads in units weighing up to 13,300 pounds. The loader is normally mounted on a wheeled chassis for mobility, since its primary intended use is at airports to load and unload cargo aircraft. However, the loader may be fixedly disposed, as on a dock, to load and unload ships, barges, and the like, and for a variety of other purposes. The cargo transferring mechanism comprises three conveyor sections which are adjustable as a unit vertically and angularly and are actuatable between stepped discontinuous relationships and coplanar, continuous, inclined relationships to effect transfer of a load onto or off of a cargo deck or the like.

*Designation of container per N.A.S. 3610

Figure 1:
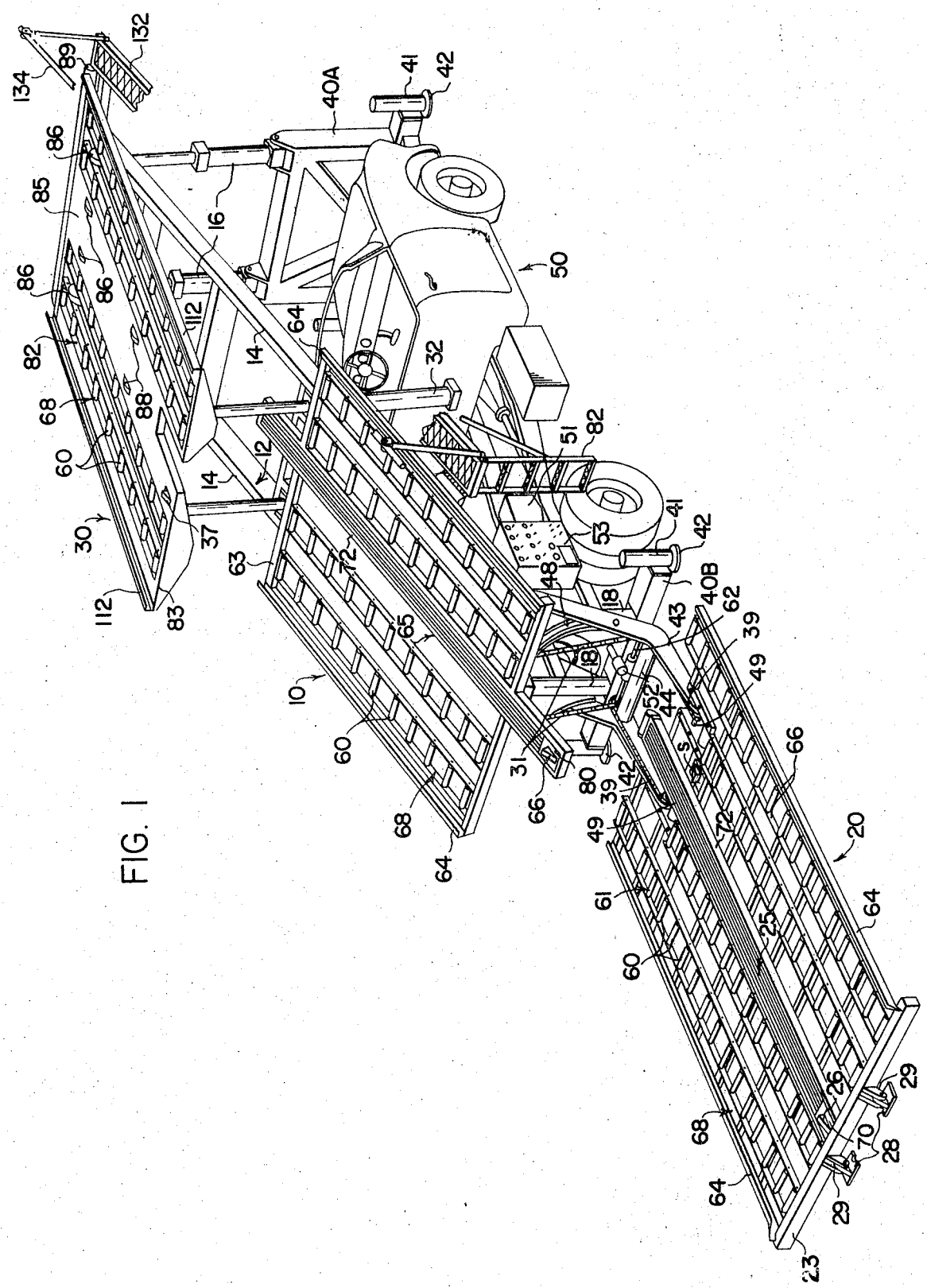
FIG. 1 is an overall perspective view of a preferred embodiment of the invention in the form of an air cargo container loader transportably mounted on a truck.

Referring now to FIG. 1, the loader comprises a median conveyor section 10 fixedly mounted on a ramp frame 12, a lower conveyor section 20 and an upper conveyor section 30 disposed at either end of the median conveyor section and movably mounted on a ramp frame. Forward and rearward support stand assemblies 40A and 40B adjustably support the ramp frame 12. In the mobile version depicted in FIG. 1, the support stand assemblies 40A and 40B are mounted on the front and rear ends of the chassis of a conventional automotive highway truck 50 or the like. The cargo transferring mechanism may be suitably powered by a fluid pump 52 mounted on the chassis of the truck 50 and operatively connected to a power take-off from the conventional drive train of the truck power plant or engine. Adaptations and modifications required for a fixedly disposed stationary unit will be apparent to those skilled in the art.

The ramp frame 12 is constructed from structural rails 14 and is supported in an adjustably inclined position on front adjustment cylinders 16 and rear adjustment cylinders 18. The cylinders are double-acting fluid actuators powered by the fluid pump 52. A cylinder 16 is mounted at each corner near the upper end of the inclined ramp frame 12, and a cylinder 18 is mounted at each corner near the lower end of the ramp frame 12. The median conveyor section 10 is disposed on the lower portion of the ramp frame 12 and extends over approximately one-half the length of the ramp frame. The lower conveyor section 20 is connected at the rear end of the ramp frame 12 so as to be swingable between a generally horizontal "down" position and a raised inclined position coplanar with the median conveyor section. The upper conveyor section 30 is disposed on the upper half of the ramp frame 12, which supports it for pivotal movement between a raised horizontal position and an inclined lowered position coplanar with the median conveyor section.

The support stand assemblies 40A and 40B are both provided with a pair of support jacks 41 resting on support pads 42 which engage the ground to carry the weight of the truck chassis, cargo transferring mechanism and cargo being transferred, independently of the truck's spring suspension system.

The front ramp adjustment cylinders 16 are pivotally disposed beneath the structural rails 14 to permit angular displacement of the cargo supporting surface of the conveyor sections. The lower end of the upper section 30 is supported on a pair of actuating cylinders 32, pivotally disposed on opposite sides of the upper section 30, as on the side rails 14, or in any other suitable manner, so as to transmit the lead to the support stand assemblies 40A, 40B and then to the support jacks 41. In the collapsed position, the actuating cylinders 32 place the upper section 30 in overlying relationship on the ramp frame 12 and in the extended position they angularly displace the upper section 30 to a substantially horizontal position For moving the lower section 20 between its lower, horizontal position and its raised, inclined position shown in solid and phantom outlines in FIG. 5, two actuating arms 43 are mounted below the lower end portion of the median conveyor section 10 on the supporting ramp frame 12 thereof. The arms 43 are rigidly interconnected to operate in unison, as components of a rigid frame, by a torque tube 44, and the following description applies equally to both of these arms. One end of each actuating arm 43 carries a pin 45 that is rotatably and slidably mounted in a slot 46 in a flange 15 that depends from a longitudinal side rail 14 of the ramp frame 12, the slot 46 extending substantially parallel to the side rail 14 of the median conveyor section 10. A follower pin 47, fixed at about the midpoint of the actuating arm 43, is rotatably and slidably mounted in a cam guide 48 that depends from near the lower end of the side rail 14, the cam guide 48 permitting rotation of the pin follower 47 while guiding it along a generally arcuate path defined by the cam guide. The opposite end of the actuating arm 43 is pivotally connected to the lower conveyor section 20 near the forward end thereof by a short-shaft 49 journaled in the arm 43 and fixedly (non-rotatably) mounted in the frame of the lower section 20.

Figure 5:
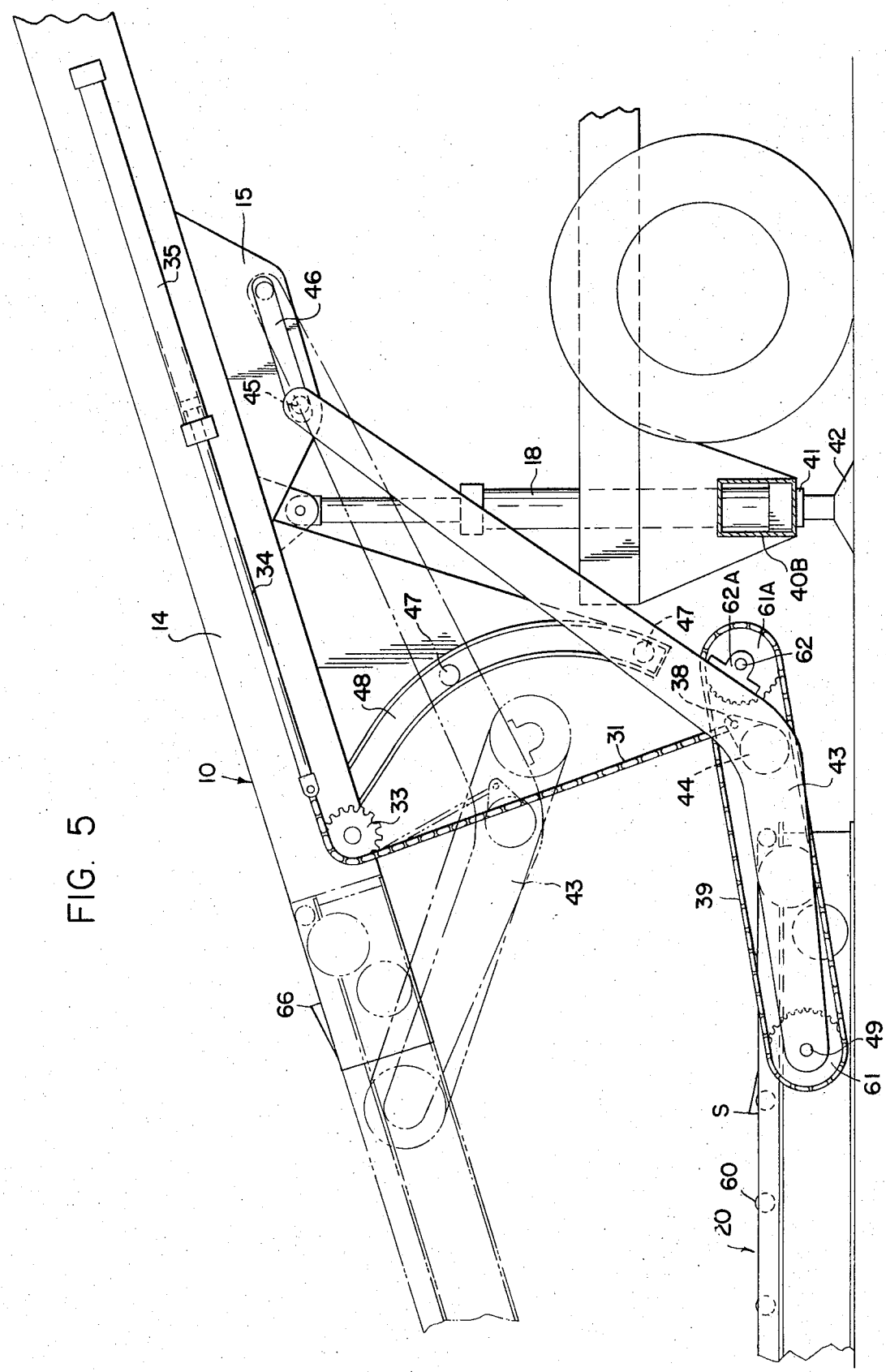
FIG. 5 is partly diagrammatic, elevational side view of the lifting mechanism for swinging the lower conveyor section from a "down" generally horizontal container-transferring positon to an inclined position coplanar with the median section, or vice versa; and thereafter, for storage, rotating the lower conveyor section into an upside down position overlying the median conveyor section.

Thus, upward and downward swinging movements of the actuating arms 43, involving both translation and rotation thereof, serve to raise and lower the lower conveyor section 20 between the two positions shown in FIG. 5. Referring to FIG. 1 and FIG. 5, such movement of the arms 43 is effected by a pair of chains 31 each attached at one end to a lug 38 provided at opposite ends of the torque tube 44. Each chain 31 is operatively trained upon a sprocket 33 rotatably disposed below the median conveyor section 10, near its aft end. The other end of each chain 31 is removably affixed to a retractable rod 34 in a double-acting fluid actuator 35 mounted beneath the median conveyor section 10. When the rod 34 is in a fully extended position, the support arms 43 are in their lowest position and the lower conveyor section 20 is in a horizontal position. When the rod 34 is retracted, the lower section 20 is raised to an inclined position so that the conveying surface of its forward end is coplanar with that of the median section 10 while the aft end of the lower section is simply pivoted about its ground-supported end, preferably on pins 17 journaled in lugs 29 of support feet 28.

For swinging the lower section 20 back and forth about its forward end on the arms 43, between the stowed and operative positions shown in FIGS. 14 and 15, a suitable driven pair of chains 39 (FIGS. 1 and 5) are trained over respective sets of sprockets 61 and 61A. As shown in FIG. 5, the sprockets 61 are fixed on the short shafts 49 in the frame of the first conveyor section 20 for rotating these shafts and the conveyor section relative to the arms 43, and the sprockets 61A are fixed on a drive shaft 62 journaled at its opposite ends in brackets 62A on the arms 43. As diagrammatically shown in FIG. 1, the drive shaft 62 is driven by any suitable power unit 52 mounted on the torque tube 44.

Referring again to FIG. 1, the median conveyor section 10 may comprise a conventional, longitudinally-extending, programmably self-actuated conveyor mechanism proportioned to be approximately the same length as the upper section 30 and the lower section 20. In a preferred embodiment, the median conveyor section comprises plural rollers or cylinders 60 that provide a multiplicity of coplanar supporting surfaces for rolling contact with articles placed thereon. The cylinders 60 are rotatably disposed on shafts in plural ladder sections 68, the longitudinal axes of the cylinders being orthogonally disposed with respect to the direction of movement of a palletized load or container. The plural ladder sections 68 are fixedly disposed in parallel relationship within a rectangular median section frame 63 which rests on the side rails 14 of the ramp frame 12. Guide rails 64 are provided on the sides of the frame 63 to guide a container along the conveyor surface.

Additional ladder sections 68, each with a multiplicity of rollers 60, are similarly provided in the lower conveyor section 20 and upper conveyor section 30. Between the ladder sections of the median conveyor section 10 and of the lower conveyor section 20, translator mechanisms 65 and 25, respectively, are provided and comprise traveling dollies 80 and 70, respectively. These two translator mechanisms may be substantially identical, although differently positioned and laterally offset with respect to each other and longitudinally overlapped, as is evident from FIGS. 1 and 2 and described in detail hereinafter. The upper conveyor section 30 is also provided with a translator mechanism, generally designated 36 in FIG. 4, which may be of simpler construction, merely involving a plurality of appropriately powered friction drive wheels, as also described hereinafter. stood the term "translator" refers to the mechanism in each conveyor section which effects controlled transfer of a container from one end of a section to another.

As may best be seen in FIGS. 10 and 11, the translators 25 includes an actuatable spring-loaded dog 26 disposed on a lower dolly 70 fitted with four tapered wheels 71, for advancing the dolly longitudinally within a track 72, either upwards or downwards, depending upon whether a container is being loaded or unloaded. A spring 27 biases the dog 26 in an upright position so that, when a container is advanced over the dog, as in a loading operation, the dog is first depressed, permitting passage of the container over it, and then it springs up in an upright position to abuttingly engage the lower edge of the container.

The track 72 extends the entire length of the translator 25. The dolly 70 traverses the entire length of the translator 25 so as to effect transfer of a container from one to another of the conveyor section 10 and conveyor section 20 when the two sections are coplanarly disposed. In like manner, the median dolly 80 traverses the entire length of the translator 65, which overhangs each end of the median section 10. The overhanging portions are adapted to be disposed coplanarly in laterally overlapping relationship with the effective lengths of translators of the lower section 20 and upper section 30 as to effect an overlapping transfer of the container from one section to a contiguous section. Such a transfer is effected, when a container is to be loaded from a lower level to a higher, laterally displaced level, by maintaining the dog 26 of the lower dolly locked against the container until the dog 66 of the median dolly is locked against it. Similarly, overlapping transfer from the median conveyor section 10 to the upper conveyor section 30 is effected by maintaining the dog 66 of the median dolly locked against the container until it is transferred to the upper translator 36 provided with a dog 37 which prevents the container from regressing.

It will be apparent that, when a container is to be lowered from the upper section 30 to the median section 10 to the lower section 20 and, thereafter, moved beyond the latter to a ground-transport vehicle, the dogs 37, 66, and 26 will all be spring-biased in an upright position and must be retracted one after another to permit transfer of the container from one section to the next and, finally, off the lower section 20. Each of these dogs is retracted by a bell-crank mechanism associated therewith. As is shown in FIG. 11 for the dog 26, the bell-crank mechanism includes a volitionally activated bell-crank fluid actuator 107, which, through links 108 and 109 is retracted when a container is to be unloaded, transferring it downwardly from one section to a contiguous section. Volitional is meant to infer an operator must deliberately set the mechanism for an unloading operation. When the actuator 107 is not activated, the dog is biased by the spring 27 in an upright position.

As may be seen in FIGS. 6–11, the dolly 70 is driven by a double-acting fluid actuator 74 adapted to provide to-and-fro movement through plural loading cables 90 (four being used in this instance as shown in FIG. 7) appropriately, sequentially reeved on sets of pulleys 91, 92, 93 and 94 within the translator for pulling a load up the conveyor system. Other convenient, controllable drive means incorporated within each conveyor section may be used, for example, a chain operatively disposed upon suitable sprockets, or a suitable worm drive. To return the dolly 70 to the lower position after upward transfer of a container has been effected, a return tensioning cable 101 is sequentially reeved on return pulleys 102, 103 and 104 (FIGS. 6 – 9 and 11) as will be hereinafter described in more detail. Both the loading-cable system and the return-tensioning cable system operate simultaneously whenever there is relative, cable-connected movement between the dolly 70 and the double-acting fluid actuator 74. Identical cablecontrolled systems are used in the lower and median translators 25 and 65 because of their compactness the, ease with which they may be visually inspected and their trouble-free, inexpensive maintenance. Thus, the following detailed description of one of these systems should be understood to apply to both.

Referring now to the loading-cable system as shown in FIGS. 6–8 and 10–11, actuator 74 is disposed in the translator 25 with its longitudinal axis parallel to the longitudinal axis of the translator so that its extensible rod 75 may be extended and retracted along that axis. The end of the extensible rod has a bracket assembly 76 fixedly disposed thereupon in which a shaft 77 is journaled. Four identical pulleys 92 are disposed for rotation in a vertical plane on the shaft 77. One end of each loading cable 90 is locked into a plate 96 on the bracket assembly (FIG. 6), is thereafter sequentially trained on pulleys 91, 92, 93 and 94, is and thereafter inserted in locking slots 97 on the forward portion of the dolly 70 (FIG. 10). It will be evident that pulleys 93 and 94 permit the desired disposition of the loading cable 90 within the translator 25 without using a large pulley. The bracket assembly 76, including each pulley 92 rotatably mounted therein and the ends of the load cables 90 removably affixed thereupon, is provided with guide wheels 98 translatably disposed in tracks 99 so as to maintain precise orientation of each pulley 92 when the extensible rod 75 is extended or retracted.

When the fluid actuator 74 is extended, the bracket assembly 76 is guidedly moved rearwardly pulling the cables 90 and causing the dolly 70 to be advanced forwardly or upwardly. The pulleys in this particular embodiment of the load-cable system provide a multiplication factor of about three; for example, a stroke of 50 inches for the extensible rod 75 causes a translation of the dolly 70 through a distance of 146 inches in its tracks 72.

Figure 9:
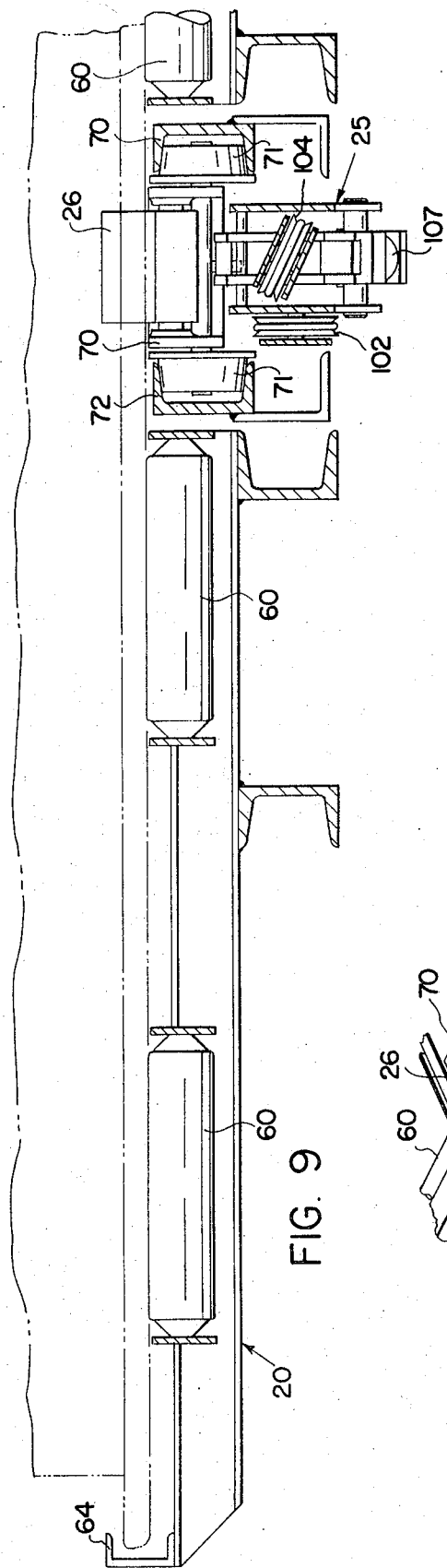
FIG. 9 is a transverse cross section along the plane 9—9 in FIG. 6 of the lower conveyor section showing details of part of the pulley arrangement in the translator.

Referring now to the return-tensioning cable system as shown in FIGS. 6-9 and 11, one end of the single return-tensioning cable 101 is fixedly attached to the shaft 77 in the bracket assembly 76 FIGS. 7 and 8) and the cable is thereafter sequentially trained upon pulleys 102, 103, and 104, the other end of the cable being removably inserted in a lock slot 105 on the dolly 70. Pulleys 102 and 104 are mounted in a bracket assembly 106 fixedly disposed on the aft end of the lower conveyor section 20. The pulley 102 is mounted for rotation in a vertical plane while pulley 104 is mounted for rotation in an oblique plane to facilitate a change of plane of the cable 101. Pulley 103 is rotatably mounted on the shaft 77 in the bracket assembly 76 on the end of the extensible rod 75 (FIGS. 7 and 9). When the extensible rod 75 is in its fully extended position, the dolly 70 is at its forwardmost or uppermost position in the translator. When the rod 75 is retracted, the return-tensioning cable system returns the dolly to the rear or lower end of the translator.

Figure 4:
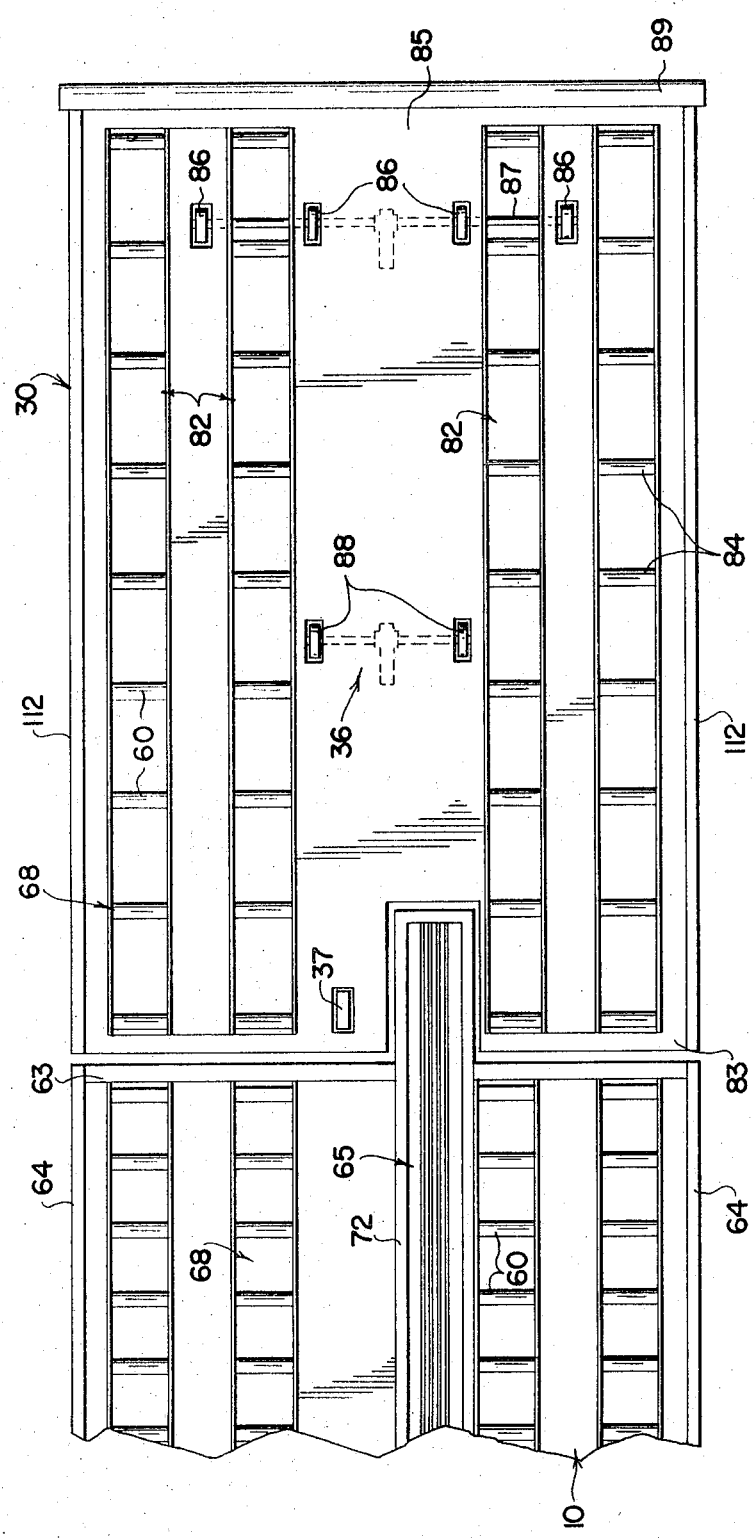
FIG. 4 is a plan view of the upper conveyor section and part of the median section.

As is shown in FIG. 4, the upper conveyor section 30 is provided with upper ladder sections 82 longitudinally disposed in an upper section frame 83. The ladder sections 82 are provided with shafts on which rollers or cylinders 84 are rotatably disposed to present surfaces upon which a container may be rollingly transferred in either direction of. The upper translator 36 includes a platform 85 notched to accommodate the upper portion of the translator 65 of the median section 10 when the upper and median sections are coplanarly disposed. The spring loaded, retractable dog 37 is located near the bottom of the platform 85 to permit overlappingly interlocked transfer of containers between dogs 37 and 66 whether containers are being loaded or unloaded. Near the top of the platform 85, plural rubber drive wheels 86 are provided on a common shaft 87 which lies below the platform 85. The drive wheels 86 are driven by a fluid motor (not shown) adapted to provide either clockwise or anti-clockwise rotation of the drive wheels 86 on the shaft 87. The circumferential surfaces of the drive wheels 86 provide rolling, frictional contact with a container to be transferred. To facilitate smooth, balanced transfer, in addition to the drive wheels 86 and the cylinders 60, a pair of auxiliary drive wheels 88 are provided about the middle of the platform 85. Depending upon the duty of the upper section 30, the auxiliary drive wheels 88 may be replaced by idler wheels. A rubber bumper 89 is provided at the upper or forward end of the upper conveyor section 30 and, as in the lower and median sections, upper guide rails 112 are used for safely guiding a container.

As shown in FIG. 1, the actuating cylinders 32 are pivotally disposed below the lower end of the upper section 30, and on opposite sides thereof, to swing the upper section between an inclined position resting on the structural rails 14 and coplanar with the median section 10, and a raised horizontal position coplanar with the deck of a transport from which the containers are to be loaded or unloaded.

It will be evident from the following outline of the operation of the loader that the precise timing and synchronization of transfer operations will depend upon the size of individual containers in relation to the length of the lower, median and upper conveyor sections. Where the length of individual containers is not substantially less than that of each conveyor section, it will be apparent that transfer of a container from one conveyor section to a contiguous conveyor section may not be commenced until both sections have been placed in a substantially coplanar relationship relative to one another. Where the container or package is relatively short and the length of each conveyor section relatively long, a dolly in the lower translator, for example, may be driven forward simultaneously while the lower section is being raised into an inclined position for coplanar transfer to the median section.

The following operation relates to containers which are to be sequentially loaded, where the containers are only slightly shorter in length than the length of each conveyor section.

As is diagrammatically illustrated in FIG. 14, the loader is in position at an aircraft with extended stabilizer pads 42 of the support jacks 41 in ground engagement. The forward end of the upper section 30 is elevated to the height of the deck of the cargo compartment by adjusting the actuating cylinders 16 and 18 and the tubular rubber bumber 89 is placed in abutting relationship with the air transporter.

As is diagrammatically illustrated in FIG. 15, the lower section 20 is inclinedly disposed coplanar with the median conveyor section 10, with the lower end of the lower section 20 in ground engagement. To place the conveyor precisely in the position illustrated, the disposition of the median conveyor section 10 is first adjusted approximately by the front and rear ramp adjustment cylinders 16 and 18. The lower section 20, which is in the stowed position folded upon the median conveyor section 10 is rotated about the ends of the actuating support arms 43 by the chain drive mechanism described hereinabove. Because the initial adjustment of the ramp cylinders 16 and 18 may have been only approximate, the lower section 20 may not be in ground engagement. Therefore, the ramp adjustment cylinders 16 and 18 are re-adjusted if needed to match the rubber bumber 89 against the deck of the cargo compartment precisely with the support feet 28 of the conveyor section 10 engaging the ground.

A container is moved onto and along the surface of the lower section 20 depresses the dog 26 and may roll up against a stop S (FIG. 16). As is obvious, this stop may be biased to a retracted position (FIG. 19) and be extended by any suitable means for performing its function during loading; or it may be biased to its extended position for performing its function during loading and be retractable as are the dogs 26, 37, and 66. The actuating support arms 43 then begin to raise the forward end of section 20 pivoting it about its aft or ground-supported end, the whereupon container rolls backwards and is locked against the dog 26 (FIG. 19). The arms 43 continue to raise the forward end of the lower section until its conveying surface is coplanar with that of the median section 10 so that the upper portion of the translator 25 and the lower portion of translator 65 are disposed in longitudinally overlapping, side-by-side, coplanar relationship (FIGS. 2 and 17). The dolly 70 is then advanced by the load cables 90 in the translator 25 by extending the rod 75, and the container is pushed upward along the inclined lower section 20. The container is advanced over and beyond the dog 66 which is then immediately spring-biased into a position lockingly abutted against the lower edge of the container, thus effecting an interlocked, overlapping, safe transfer of the container from the lower conveyor section to the median conveyor section (as shown in phantom outline in FIG. 17). After the foregoing transfer is effected, the dolly 70 commences its return to its position at the lower end of the translator 25 by the return tensioning cable 101 acted upon by retraction of the rod 75 of the loading fluid actuator 74 and, simultaneously, the arms 43 return the lower section 20 to its horizontal position for accepting a succeeding container (FIG. 18). In the meanwhile, the median dolly 80 is being advanced up the translator 65, the upper end of which is accomodated in the notched lower end of the upper section 30 which is coplanarly contiguously disposed with respect to the median section 10. When the dolly 80 arrives at the upper end of the translator 65, the container is pushed over and beyond the dog 37 effecting an overlapping interlocked transfer of the container in the same manner as between the lower and median dogs described hereinbefore to the position shown in phantom outline in FIG. 18. After the latter transfer is effected, the dolly 80 returns to its lower position in the same manner as does the dolly 70 of the lower section 20. Simultaneously, the actuating cylinders 32 are extended, raising the upper section 30 into a horizontal position (FIG. 19,) whereupon the device wheels 86 are driven to transfer the container off the upper section 30. While the first container is being discharged from the upper section 30, the lower section 20 is raising the next container up to the inclined attitude of the median conveyor section 10 for similar travel along the conveyor and discharge at its upper end.

The operation of the conveyor sections of the instant loader may be programmably interlocked by known controls for interconnected cooperation of each section so as to effect an essentially continuous transfer of containers. The rate at which the translators of each section operate and the frequency of the stepped discontinuous relationships between contiguous sections may be adjusted depending upon the size and weight of the containers to be loaded. In a preferred embodiment, the single, hydraulic pump 52 provides the driving power for all the movements of the loader. A master control panel 53 provides programmable interlocked overlapping transfer of each container between contiguous sections and coordinates all movements of each conveyor section.

The foregoing sequence of operations for loading a container from a ground transporter onto an air cargo transporter is generally reversed when an aircraft is being unloaded. As has been described hereinbefore, an operator must set the bellcrank mechanisms in each conveyor section for retracting each dog to permit transfer of a container from an upper conveyor section to a lower section.

In another specific embodiment of the instant invention diagrammatically illustrated in FIG. 20, a single conveyor section 120 identical to the lower section 20 in the embodiment of FIGS. 1-19, is used alone in combination with a stationary dock. It will be apparent that the single conveyor section 120 may be equally adapted for use with a truck bed or the like. Large containers such as the LD-3 and LD-7 types may be moved from a lower floor position to a higher position as on an elevated dock utilizing only the single section which is pivotally mounted with respect to the higher dock surface and is pivotable about ground supported feet 128 on the lower end of the single section. The single section 120 is pivotally disposed on actuating support arms 143, as described hereinabove for the lower section 20 so as to be pivotable about feet 128 at one end thereof by actuating the arms 143 and then pivotable about the arms 143 by driving the chains 139. A container is rolled onto the single conveyor section 120 while in its lowered generally horizontal position with the aft end of the single section in ground engagement (partly shown in phantom outline). The forward end of the single section is then raised to an inclined position by actuation of the arms 143 by means of the fluid actuator 135 until the forward end of the single section is at about the same level as that of the elevated dock surface to which the container is to be transferred. A fluid actuator 174, functioning in the same way as in the lower section 20 described hereinabove, is then actuated, the dolly 170 is controlledly advanced and the dog 126 pushes the container upwards until a portion of the container overhangs the edge of the forward end of the single section while inclinedly disposed at edge of the dock. The weight of the container is thus carried essentially, directly above the pivoted support of the conveyor section on the arms 143, and the moment of the load on the conveyor section is minimized. The chain 139 is then actuated to raise the aft end of the single section from a ground engaging position to an essentially horizontal position coplanar with the dock surface. If necessary, the aft end of the single section may be further raised to tilt it slightly downwardly toward the dock, enabling the container to be more easily discharged from off the front end of the single section and onto the dock without further advancing the dolly 170. After having discharged the container, the dolly 170 is returned to the bottom of the single conveyor section 120, and the section is lowered to an essentially horizontal position to repeat the loading operation. Unloading a container from a dock at a higher level to a lower floor level is the reverse of the operations described hereinabove.

Certain accessories are provided which facilitate the use of the loaders of the invention. As is shown in FIG. 1, a walk ramp 132 is hingedly disposed alongside the median and upper conveyor sections and provides access to a container on either section. The walk ramp 132 is provided with a hand rail 134 and a ladder 136 which are compactly foldable for storage when the loader is not in use.

Figure 13:
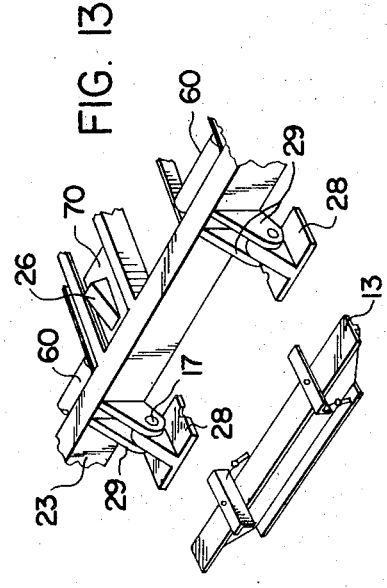
FIG. 13 is an exploded view showing an adaptor and the ground-supported end of the lower conveyor section adapted to be locked together for supporting the latter at a relatively low bed height of a standard container transport dolly.
Figure 12:
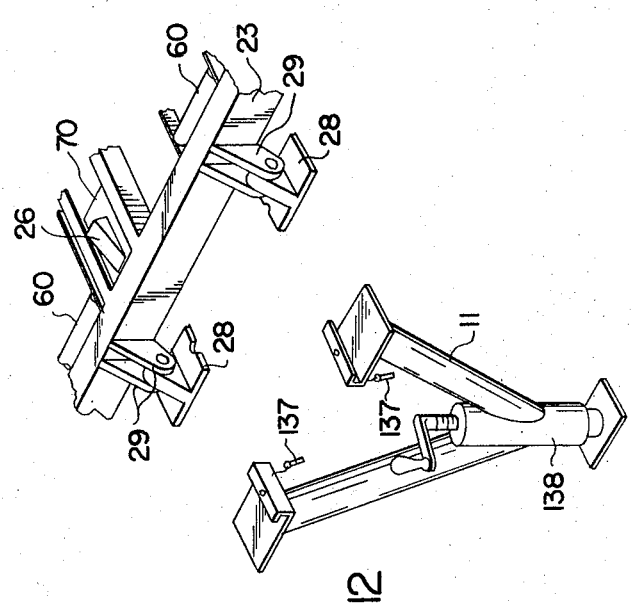

As is shown in FIGS. 12 and 13, the lower section 20 of the loader, or the single conveyor section 120, may be supported in ground-engaging position at any predetermined height, for example, the height of a truck bed or other ground transportation vehicle, by using suitable adapters 11 and 13. A Y-shaped truck bed adapter is provided with a threadedly disposed center stem section 138 which permits fine adjustment of its height. Locking pins 137 permit locking the feet 28 of the lower conveyor section 20 or the feet 128 of the single conveyor section 120, onto the adapter 11. As is shown in FIG. 13, a relatively low adapter 13 is provided, onto which the feet 28 or the feet 128 may be locked so as to place the surface of the conveyor section at a sufficiently low level to accept a container from a standard transport dolly.

The scope of the invention is not limited to the slavish imitation of all of the structural and operative details mentioned above. These have been given merely by way of example of presently preferred embodiments of the invention.

What is claimed is:

1. A multi-section conveyor comprising a support structure, lower, median, and upper conveyor sections mounted on said support structure, and means for moving said sections relative to one another between positions in which they are alternately (a) longitudinally inclined in end-to-end, coplanar, coacting relationship with each contiguous section and (b) disposed in vertically offset discontinuous relationships with one another; said median section being mounted with an adjustable longitudinal inclination that determines the common inclination of the sections in their coplanar relationship; said lower section being mounted for rotation about its ground-supported end remote from said median section as it moves between its inclined position coplanar with said median section and a generally horizontal disposition in said discontinuous relationship; and said upper section being mounted for rotation about its end remote from said median section as it moves between its inclined position coplanar with said median section and a generally horizontal position in said discontinuous relationship.

2. A conveyor for transferring articles or containers between feeding and receiving locations that are vertically and horizontally offset, comprising a lower conveyor section, an upper conveyor section and an intermediate, median conveyor section, actuating means for moving said sections relative to one another between positions in which contiguous sections are alternately (a) longitudinally inclined in end-to-end, coplanar, coacting relationship to effect the transfer of a container from one to the other and (b) disposed in stepped discontinuous relationships with one another to effect transfer of said container on or off said conveyor; said median section being inclinedly mounted on a ramp frame having means for adjusting the height and inclination thereof; said lower section being pivotally mounted with respect to said median section for swinging about a ground-supported end of the lower section remote from said median section between a generally horizontal position and its inclined position coplanar with said median section; said upper section being pivotally mounted with respect to said median section for pivoting about its end remote from said median section between its inclined position coplanar with said median section and a generally horizontal position; said power means to said actuating means and adjusting means for adjusting the height and inclination of said sections in their coplanar relationship and for independently moving said lower and upper sections between their coplanar and their stepped discontinuous relationships with said median section to effect section-to-section transfer of one container while a succeeding one is being received for transfer and to effect discharge of said one container during section-to-section transfer of said succeeding container.

3. The conveyor of claim 2 in which the actuating means for said lower conveyor section comprises a pair of arms having corresponding ends that are pivotally connected to said lower section and are mounted relative to said median section for pivotal and translatory movement relative thereto.

4. The conveyor of claim 2 in which the actuating means for said lower conveyor section comprises a pair of arms having corresponding ends that are pivotally connected to said lower section and are mounted relative to said median section for pivotal and translatory movement relative thereto, guide means constraining pivotal fulcrums of said arms at the other ends thereof to limited translation relative to said median section along a first path, and guide means constraining pivotal fulcrums of said arms at points intermediate the ends thereof to limited translation along a second path extending generally transversely of said first path.

5. The conveyor of claim 2 in which the actuating means for said lower conveyor section comprises a pair of arms having corresponding ends that are pivotally connected to said lower section and are mounted relative to said median section for pivotal and translatory movement relative thereto, guide means constraining pivotal fulcrums of said arms at the other ends thereof to limited translation relative to said median section along a first path, and guide means constraining pivotal fulcrums of said arms at points intermediate the ends thereof to limited translation along a second path extending generally transversely of said first path, and said power means is coupled to said arms for driving said pivotal fulcrums of said arms along their respective first and second paths to effect said pivotal and translatory movement of the arms.

6. The conveyor of claim 2 in which the actuating means for said lower conveyor section comprises a pair of arms having corresponding ends that are pivotally connected to said lower section and are mounted relative to said median section for pivotal and translatory movement relative thereto, and the conveyor includes additional, operator controlled actuating means for swinging said lower section about its pivotal connections to said arms to dispose the lower section in an inverted, stored position overlying said median section.

7. The conveyor of claim 2 including means for adjustably maintaining said ground supported end of said lower conveyor section at different elevations above ground for accommodating varying elevations of auxiliary, ground-supported apparatus for feeding containers to the lower section and receiving containers from the lower section.

8. The conveyor of claim 2, including a self-propelled, wheeled chassis on which the conveyor is mounted for mobility when not in operation and a prime mover mounted on said chassis and operatively coupled to chassis wheels for propelling the chassis, said power means of the conveyor comprising a hydraulic pump and a power take-off from said prime mover for driving said pump.

9. The conveyor of claim 2, including a self-propelled, wheeled chassis on which the conveyor is mounted for mobility when not in operation, said height and inclination adjusting means of said ramp frame comprising fore and aft extensible supports mounted on said chassis to adjust the height and inclination of all three of said conveyor sections in their coplanar relationship.

10. The conveyor of claim 2, including a self-propelled, wheeled chassis on which the conveyor is mounted for mobility when not in operation, said height and inclination adjusting means of said ramp frame comprising fore and aft extensible supports mounted on said chassis to adjust the height and inclination of all three of said conveyor sections in their coplanar relationship, and fore and aft extensible jacks mounted on said chassis for extension into ground engagement to support substantially the entire weight of the chassis, the conveyor, and the burden of the conveyor while the conveyor is in operation.

11. The conveyor of claim 2 in which each of said conveyor sections includes independently operable translator means for moving containers therealong, the translator means of the conveyor sections having operating paths that overlap in longitudinal extent at junction zones of contiguous sections and each being operable to supportingly engage a container for translating it toward a contiguous section until the container has been so engaged by the translator of said contiguous section adjacent the junction zone therebetween.

12. The conveyor of claim 2 in which each of said conveyor sections includes independently operable translator means for moving containers therealong, the translator means of the conveyor sections having operating paths that overlap in longitudinal extent at junction zones of contiguous sections and each being operable to supportingly engage a container for translating it toward a contiguous section until the container has been so engaged by the translator of said contiguous section adjacent the junction zone therebetween, each translator means including independent power means therefor, and the power means for moving said conveyor sections and the power means for operating said translator means being hydraulically driven from a common source of pressurized hydraulic fluid.

13. The conveyor of claim 12, including a self-propelled, wheeled chassis on which the conveyor is mounted for mobility when not in operation and a prime mover mounted on said chassis and operatively coupled to chassis wheels for propelling the chassis, said source of pressurized hydraulic fluid comprising a pump and a power take-off from said prime mover for driving the pump.

14. A plural-section conveyor comprising a support structure, first and second conveyor sections mounted in series on said support structure, means on said support structure for disposing the conveyor sections at any selected height and inclination within ranges of adjustment to bridge between horizontally spaced locations at different levels, and means for moving the first conveyor section relative to the second conveyor section between positions in which they are alternately disposed (a) with the first conveyor section inclined to extend upwardly from a low level into end-to-end, coacting relationship with the other and (b) with the first conveyor section vertically offset below and in discontinuous relationship with the other; said first section being mounted for rotation about a ground-supported end at said low level and remote from said second section as the first section moves between its inclined position in coacting relationship with the second section and a generally horizontal disposition below and in said discontinuous relationship with the second section, whereby an article to be conveyed may be moved onto said first conveyor section while in its lower, generally horizontal disposition and the first section may then be moved by rotation about its ground-supported end to its inclined position in coacting relationship with the second section for transporting the article from the former onto the latter and along the latter.

15. A plural-section conveyor according to claim 14 in which said support structure is a self-propelled, wheeled chassis on which the plural section conveyor is mounted for mobility when not in operation.

16. A plural-section conveyor according to claim 14 in which said means for moving said first conveyor section includes arm means pivotally connected to both conveyor sections for guiding the movement of the first section relative to the second section, the pivotal connection of said arm means to said second conveyor section including guide means at each of a pair of pivot locations spaced along said arm means for imparting a combination of pivotal and translatory movement to the arm means relative to the second conveyor section.

17. A plural-section conveyor according to claim 14 in which said means for moving said first conveyor section relative to said second conveyor section comprises arm means pivotally connected at one end thereof to said first section and mounted on said second section for pivotal and translatory movement relative thereto, guide means constraining a pivotal fulcrum of said arm means at the other end thereof to limited translation along a first path, guide means constraining a pivotal fulcrum of said arm means intermediate said ends thereof to limited translation along a second path extending generally transversely of said first path, and power means acting between said arm means and second conveyor section for driving said pivotal fulcrums along their respective first and second paths to effect said pivotal and translatory movement thereof.

18. A plural-section conveyor according to claim 14 in which said first conveyor section comprises means defining an article supporting plane, a dolly mounted for travel below and along said plane, means on the dolly biased for retractably projecting above said plane for engaging an article to be supported at said plane, and means for positively moving said dolly back and forth along said plane for a distance at least substantially equal to the length of said first conveyor section.

19. A plural-section conveyor according to claim 14 in which each of said first and second conveyor sections comprises means defining an article supporting plane, a dolly mounted for travel below and said plane thereof, means on the dolly biased for retractably projecting above said plane for engaging an article to be supported at said plane, and means for positively moving said dolly back and forth along said plane for a distance at least substantially equal to the length of that conveyor section, the paths of travel of said dollies being laterally offset relative to each other and being longitudinally overlapping when the first and second conveyor sections are disposed with their article supporting planes in substantially coplanar alignment, and means for swinging said first conveyor section about its upper end in an upward direction from its inclined position in end-to-end coacting relationship with said second conveyor section.

20. A plural-section conveyor according to claim 14 in which each of said first and second conveyor sections comprises means defining an article supporting plane, a dolly mounted for travel below and along said plane, means on the dolly biased for retractably projecting above said plane for engaging an article to be supported at said plane, and means for positively moving said dolly back and forth along said plane for a distance at least substantially equal to the length of that conveyor section, the paths of travel of said dollies being laterally offset relative to each other and being longitudinally overlapping when the first and second conveyor sections are disposed with their article supporting planes in substantially coplanar alignment, and means for swinging said first conveyor section about its upper end in an upward direction from its inclined position in end-to-end coacting relationship with said second conveyor section to a storage position overlying said second conveyor section.

21. A shiftable conveyor comprising a support structure and a conveyor assembly mounted thereon for receiving or discharging articles moving horizontally at a terminal end of the conveyor at a low level at one location, for receiving or discharging articles moving horizontally at an opposite terminal end of the conveyor at an upper level and horizontally offset location, and for transporting the articles along the conveyor assembly between said locations, said conveyor assembly comprising at least one conveyor section, and said conveyor assembly being mounted on said support structure to bridge on a planar incline between said locations; actuating means interconnecting the support structure and the conveyor assembly for reversibly pivoting at least an end section of the conveyor assembly about a terminal end thereof supported at said low level, from a position extending along said incline to a position extending horizontally at said low level, for the receipt or discharge of articles horizontally at said low level, and for reversibly pivoting at least an end section of the conveyor assembly about an opposite terminal end thereof at said upper level and horizontally offset location, from a position extending along said incline to a position extending horizontally at said upper level for the receipt or discharge of articles horizontally at said upper level.

22. A shiftable conveyor according to claim 21, including means operative to move articles along said conveyor from a receiving position adjacent either terminal end thereof to a discharge position adjacent the opposite terminal end thereof.

23. A shiftable conveyor according to claim 21 in which said support structure is a self-propelled, wheeled chassis on which the conveyor assembly is mounted for mobility when not in operation, and said chassis includes means for positioning the conveyor assembly at different heights and inclinations to bridge on a planar incline between said offset locations at any selected low level and upper level within ranges of adjustment.

* * * * *